United States Patent
Uemura et al.

(10) Patent No.: US 8,541,155 B2
(45) Date of Patent: Sep. 24, 2013

(54) RESIN-COATED CARRIER FOR ELECTROPHOTOGRAPHIC DEVELOPER, AND ELECTROPHOTOGRAPHIC DEVELOPER

(75) Inventors: Tetsuya Uemura, Kashiwa (JP); Makoto Ishikawa, Ichikawa (JP)

(73) Assignee: Powdertech Co., Ltd., Chiba (JP)

( * ) Notice: Subject to any disclaimer, the term of this patent is extended or adjusted under 35 U.S.C. 154(b) by 0 days.

(21) Appl. No.: 13/432,360

(22) Filed: Mar. 28, 2012

(65) Prior Publication Data
US 2012/0251942 A1 Oct. 4, 2012

(30) Foreign Application Priority Data

Mar. 30, 2011 (JP) ................................ 2011-076015

(51) Int. Cl.
*G03G 9/113* (2006.01)
(52) U.S. Cl.
USPC .................................................. 430/111.35
(58) Field of Classification Search
USPC ........................ 430/111.35, 111.32
See application file for complete search history.

(56) References Cited

U.S. PATENT DOCUMENTS

| | | |
|---|---|---|
| 2009/0170022 A1 | 7/2009 | Kojima et al. |
| 2009/0297974 A1 | 12/2009 | Kojima et al. |
| 2010/0233612 A1 | 9/2010 | Uemura et al. |
| 2010/0248113 A1 | 9/2010 | Uemura et al. |
| 2011/0244388 A1 | 10/2011 | Uemura et al. |
| 2011/0244389 A1 | 10/2011 | Kojima et al. |
| 2011/0272641 A1 * | 11/2011 | Bastiaens et al. ............. 252/511 |

FOREIGN PATENT DOCUMENTS

| | | |
|---|---|---|
| JP | 2004-45773 | 2/2004 |
| JP | 2006-091381 A1 * | 4/2006 |
| JP | 2009-210795 | 9/2009 |

OTHER PUBLICATIONS

AIPN Japanese Patent Office machine-assisted translation of JP 2006-091381 (pub. Apr. 2006).*
Nanocyl NC7000 Thin Multiwall Carbon Nanotubes Product Information Sheet and Product Datasheet, Nanocyl, copyright 2009, www.nanocyl.com.*
Ma-Hock, Lan et al., Toxicological Sciences 112(2), 468-481 (2009), pp. 468-469.*

* cited by examiner

*Primary Examiner* — Janis L Dote
(74) *Attorney, Agent, or Firm* — Greenblum & Bernstein, P.L.C.

(57) ABSTRACT

There are provided a resin-coated carrier for an electrophotographic developer, in which a magnetic particle is coated with a resin on its surface, and the coating resin contains a carbon nanotube having a carbon content of 75% by weight or more, and an electrophotographic developer using the resin-coated carrier.

6 Claims, No Drawings

RESIN-COATED CARRIER FOR ELECTROPHOTOGRAPHIC DEVELOPER, AND ELECTROPHOTOGRAPHIC DEVELOPER

BACKGROUND OF THE INVENTION

1. Field of the Invention

The present invention relates to a resin-coated carrier for an electrophotographic developer used for a two-component electrophotographic developer for use in copying machines, printers and the like, and an electrophotographic developer using the carrier.

2. Description of the Related Art

In order to improve the durability of carriers for two-component developers, there have been reported resin-coated carriers coated with various types of resins as a toner spent-preventive measure.

However, by coating a carrier with a resin, the resistance of the carrier increases, and there arise problems of causing a decrease in image density and a decrease in image quality such as an edge phenomenon. The resistance value of a carrier must be optimized according to machine systems and development conditions. As the carrier resistance adjustment method, addition of a conductive substance (conductive agent) to a coating resin layer has been reported a lot. As usual conductive substances, various types of carbon black are broadly known because they are inexpensive and allow easy adjustment of the resistance.

Although for color toners, particularly light-colored toners (yellow toners and the like), a carrier whose resistance is adjusted by addition of carbon black to a coating resin has no problem with the image density and the edge phenomenon, but there arises a problem that the carbon black added to the coating resin is mingled in the toner and makes the color turbid, thereby decreasing the image quality. Also in regard to the environmental dependency, carbon black itself has so low resistance that a carrier using the carbon black largely depends on resistance, thereby causing charge leakage particularly at a high temperature and a high humidity; thus, when a power source of a machine is turned on, scumming is liable to occur due to intense discharge and charge rise is poor, thereby resulting in that a clear image cannot be obtained. Thus, the carrier using the carbon black has a problem with the environmental dependency.

Conversely, if the amount of carbon black added is reduced in order to improve the color smear and the environmental dependency, a decrease in the image density and a decrease in the image quality such as an edge phenomenon are caused.

In order to simultaneously meet measures to a decrease in the image density, a decrease in the image quality such as an edge phenomenon, the color smear and the environmental dependency as described above, the following proposals have been made. That is, in Japanese Patent Laid-Open No. 2004-45773, a carrier for an electrophotographic developer is proposed in which the particle surface of a magnetic carrier core material is provided with a coating resin layer containing fullerene and/or a carbon nanotube.

Japanese Patent Laid-Open No. 2009-210795 proposes a carrier for electrophotography having at least a core material particle and a coating layer which coats the core material particle, in which carrier for electrophotography the coating resin layer contains at least a binder resin, a solid particle and a carbon nanotube; and if the particle diameter of the solid particle is taken as D (μm) and the average thickness of the resin portion in the coating layer is taken as h (μm), 1<(D/h) <10 is satisfied.

However, it is the present situation that in the above-mentioned proposals, a coating layer is shaved due to long-time endurance printing and color smear thereby occurs, and thus the above-mentioned proposals do not provide any drastic measures.

In recent years, studies in high-charge amount areas have been made in order to make a toner particle diameter small along with the requirement of high image quality. Also along with image quality enhancement and life elongation of carrier core materials, the carrier core materials have moved from high-magnetic force core materials such as iron powder to low-magnetic force core materials such as ferrites, thereby causing resistance as core materials to increase; as a result, the resistance of developers is too high by conventional methods, which causes a decrease in the image density and the occurrence of the edge phenomenon, thus causing a problem that a desired image quality and life cannot be obtained. If the amount of a conductive substance added is increased to adjust the resistance, the strength of coating resins decreases, thereby resulting in further shortening the life.

SUMMARY OF THE INVENTION

In view of this, it is an object of the present invention to provide a resin-coated carrier for an electrophotographic developer which does not cause color smear especially for a color toner, a decrease in image density due to high resistance of a carrier, and a decrease in image quality such as an edge phenomenon, and which further has a high durability, and to provide an electrophotographic developer using the resin-coated carrier.

The present inventors have found, as a result of studies, that the above problems can be solved when a carbon nanotube having specific properties is contained in a coating resin which coats a surface of a carrier core material, and thereby accomplished the present invention.

That is, the present invention provides a resin-coated carrier for an electrophotographic developer in which a magnetic particle is coated with a resin on its surface, and the coating resin contains a carbon nanotube having a carbon content of 75% by weight or more.

In the resin-coated carrier for an electrophotographic developer according to the present invention, the carbon nanotube is desirably contained in 0.1 to 25.0% by weight with respect to a solid content of the coating resin.

In the resin-coated carrier for an electrophotographic developer according to the present invention, the carbon nanotube desirably has a fiber length of 0.5 to 4.0 μm.

In the resin-coated carrier for an electrophotographic developer according to the present invention, the carbon nanotube desirably has a content of an iron element of 10 to 50% by weight with respect to the total amount of the elements excluding carbon.

The present invention further provides an electrophotographic developer containing the resin-coated carrier and a toner.

Use of the resin-coated carrier for an electrophotographic developer according to the present invention can provide an electrophotographic developer which has a further high durability without causing color smear especially for a color toner, a decrease in image density due to high resistance of a carrier, and a decrease in the image quality such as the edge phenomenon.

DETAILED DESCRIPTION OF THE EMBODIMENTS

Hereinafter, the embodiments according to the present invention will be described.

<Resin-coated Carrier for an Electrophotographic Developer According to the Present Invention>

In a resin-coated carrier for an electrophotographic developer according to the present invention, a surface of a magnetic particle (carrier core material) is coated with a resin.

The magnetic particle used here as a carrier core material includes iron powder, magnetite particles, resin carrier particles and ferrite particles, which are conventionally used as carriers for electrophotographic developers. Especially above all, ferrites are desirable which contain at least one selected from Mn, Mg, Li, Ca, Sr and Ti. In consideration of the flow of the environmental load reduction including waste regulations in recent years, it is preferable that heavy metals of Cu, Zn and Ni are not contained beyond the range of inevitable impurities (associated impurities).

In the case where the magnetic particle is a ferrite particle, a ferrite particle having a high void fraction may be used. In this case, the ferrite particle can be used as a resin-filled ferrite carrier in which voids of the ferrite particle are filled with a resin.

The average particle diameter of the magnetic particle is desirably 15 to 80 μm, and this range can prevent carrier beads carry over, and can provide a good image quality. With the average particle diameter of less than 15 μm, the carrier beads carry over is liable to occur, which is not preferable. With the average particle diameter exceeding 80 μm, the image quality is liable to degrade, which is not preferable.

A coating resin which coats the magnetic particle surface is not particularly limited, and includes resins such as straight silicone resins, acryl resins, polyester resins, epoxy resins, polyamide resins, polyamidoimide resins, alkyd resins, urethane resins and fluororesins, modified resins thereof, and resins in combination of two or more thereof.

The resin coating amount is desirably 0.1 to 3.5% by weight with respect to a carrier core material (magnetic particle). With the resin coating amount of less than 0.1% by weight, the spent of a toner deteriorates, and the charge amount after endurance printing decreases. With the resin coating amount exceeding 3.5% by weight, particle aggregation occurs, and the spent of a toner deteriorates.

The resin-coated carrier for an electrophotographic developer according to the present invention contains a carbon nanotube in the coating resin. The carbon nanotube used here is one having a carbon content of 75% by weight or more, and preferably 85% by weight or more. In the case of using a carbon nanotube having a carbon content of less than 75% by weight, a desired resistance value cannot be obtained, and a decrease in the charge amount, a decrease in the image density and the occurrence of the edge phenomenon are caused, which is not preferable.

A carbon nanotube used in the present invention desirably has a fiber length of 0.5 to 4.0 μm, and more desirably 1.0 to 4.0 μm. In the case where the fiber length is less than 0.5 μm, the carbon nanotube is not sufficiently retained in the coating resin, and color smear occurs. If the fiber length exceeds 4.0 μm, leakage occurs, and image defects such as white spots are caused, which is not desirable.

In the carbon nanotube used in the present invention, the content of an iron element with respect to the total amount of elements excluding a carbon element is desirably 10 to 50% by weight, and more desirably 20 to 40% by weight. In the case where the content of an iron element is less than 10% by weight, although the reason is not definite, the charge amount decreases, and fogging deteriorates. If the content of the iron element exceeds 50% by weight, a high-purity carbon nanotube cannot be obtained, thereby resulting in that a desired resistance cannot be obtained, and a decrease in the image quality and the edge phenomenon are caused.

The content of the carbon nanotube is desirably 0.1 to 25.0% by weight, and more desirably 0.5 to 20.0% by weight, with respect to a coating resin solid content. In the case where the content of the carbon nanotube is less than 0.1% by weight, the effect of the inclusion of a carbon nanotube cannot be attained, and a desired resistance cannot be obtained. In the case where the content of the carbon nanotube exceeds 25.0% by weight, the fogging deteriorates.

In the coating resin, the carbon nanotube and various types of conductive agents can be used in combination. The conductive agent includes conductive carbons, oxides such as titanium oxide and tin oxide, various types of organic conductive agents, ionic liquids and ionic conductive resins.

A charge control agent can be further contained in the coating resin. Examples of the charge control agent include various types of charge control agents used commonly for toners, and various types of silane coupling agents. This is because, although the charging capability sometimes decreases when a large amount of a resin is filled, addition of various types of charge control agents and silane coupling agents can control the charging capability. The usable types of charge control agents and coupling agents are not particularly limited, but are preferably charge control agents such as nigrosine dyes, quaternary ammonium salts, organometal complexes and metal-containing monoazo dyes, aminosilane coupling agents and the like.

The resin-coated carrier for an electrophotographic developer according to the present invention desirably has an electric resistance (LogR) of 6.0 to 11.5. If the electric resistance exceeds 11.5, a decrease in the image density, the edge phenomenon and the high-resistance fogging occur. If the electric resistance is less than 6.0, the low-resistance fogging deteriorates. The electric resistance is measured by the following.

(Resistance)

Non-magnetic parallel flat plate electrodes (10 mm×40 mm) are provided to face each other with an interelectrode interval of 1.0 mm, and 200 mg of a sample is weighed and filled therebetween. A magnet (surface magnetic flux density: 1,500 Gauss, the area of the magnet contacting the electrodes: 10 mm×30 mm) was attached to the parallel flat electrodes to hold the sample between the electrodes; a voltage of 100 V was applied, and a resistance at the applied voltage was measured by an insulation-resistance tester (SM-8210, made by DKK-TOA Corp.). The measurement was carried out in a thermo-hygrostat room controlled at a room temperature of 25° C. and a humidity of 55%.

<The Electrophotographic Developer According to the Present Invention>

Then, the electrophotographic developer according to the present invention will be described.

The electrophotographic developer according to the present invention comprises the above-mentioned resin-coated carrier for an electrophotographic developer, and a toner.

A toner particle constituting the electrophotographic developer according to the present invention includes a pulverized toner particle produced by a pulverizing method and a polymerized toner particle produced by a polymerizing method. In the present invention, the toner particles obtained by either of the methods can be used.

The pulverized toner particle can be obtained in such a manner that: for example, a binding resin, a charge control agent and a colorant are sufficiently mixed by a mixer such as a Henschel mixer; the mixture is melt-kneaded by a twin-screw extruder or the like and cooled; the resulting extruded material is then pulverized and classified; external additives are added to the classified material; and then the resulting mixture is mixed by a mixer or the like.

The binding resin constituting the pulverized toner particle is not particularly limited, but includes polystyrene, chloropolystyrene, styrene-chlorostyrene copolymers, styrene-acrylate copolymers, styrene-methacrylic acid copolymers, and additionally rosin-modified maleic resins, epoxy resins, polyester resins and polyurethane resins. These are used singly or as a mixture thereof.

Any charge control agent can be used. Examples of a positively chargeable toner include nigrosine dyes and quaternary ammonium salts; and examples of a negatively chargeable toner include metal-containing monoazo dyes.

The colorant (color material) usable is a conventionally known dyes and pigments. For example, usable are carbon black, phthalocyanine blue, Permanent Red, chrome yellow, phthalocyanine green and the like. Besides, external additives, such as silica powder and titania, to improve the fluidity and aggregation resistance of a toner may be added depending on the toner particle.

The polymerized toner particle is a toner particle produced by a well-known method such as a suspension polymerization method, an emulsion polymerization method, an emulsion aggregation method, an ester extension polymerization method or a phase transition emulsion method. Such a polymerized toner particle is obtained in such a manner that, for example, a colored dispersion liquid containing a colorant dispersed in water using a surfactant, a polymerizable monomer, a surfactant and a polymerization initiator are mixed and stirred in an aqueous medium to emulsify and disperse the polymerizable monomer in the aqueous medium, thereby polymerizing the polymerizable monomer under stirring and mixing; and after that, a salting-out agent is added thereto to salt out a polymer particle. The particle thus obtained by the salting-out is filtered, washed, and dried to obtain a polymerized toner particle. Thereafter, as required, external additives are added to the dried toner particle.

When the polymerized toner particle is produced, a fixation improving agent and a charge control agent may be further blended in addition to the polymerizable monomer, the surfactant, the polymerization initiator and the colorant, whereby various properties of the polymerized toner particle thus obtained can be controlled and improved. In order to improve the dispersibility of the polymerizable monomer in the aqueous medium and to regulate the molecular weight of a polymer obtained, a chain transfer agent may be further used.

The polymerizable monomer used for production of the polymerized toner particle is not particularly limited, but examples of the monomers include styrene and its derivatives, ethylenic unsaturated monoolefins such as ethylene and propylene, halogenated vinyls such as vinyl chloride, vinyl esters such as vinyl acetate, and α-methylene aliphatic monocarboxylic acid esters such as methyl acrylate, ethyl acrylate, methyl methacrylate, ethyl methacrylate, 2-ethylhexyl methacrylate, acrylic acid dimethylamino ester and methacrylic acid diethylamino ester.

The colorant (color material) usable in preparation of the polymerized toner particle is conventionally known dyes and pigments. For example, carbon black, phthalocyanine blue, Permanent Red, chrome yellow, phthalocyanine green and the like are usable. These colorants may be modified on their surface using a silane coupling agent, a titanium coupling agent or the like.

The surfactant usable in production of the polymerized toner particle is an anionic surfactant, a cationic surfactant, an amphoteric surfactant and a nonionic surfactant.

Here, the anionic surfactant includes fatty acid salts such as sodium oleate and castor oil, alkylsulfate esters such as sodium laurylsulfate and ammonium laurylsulfate, alkylbenzenesulfonate salts such as sodium dodecylbenzenesulfonate, alkylnaphthalenesulfonates, alkylphosphate salts, naphthalenesulfonic acid-formalin condensates and polyoxyethylene alkylsulfate salts. The nonionic surfactant includes polyoxyethylene alkyl ethers, polyoxyethylene fatty acid esters, sorbitan fatty acid esters, polyoxyethylene alkylamines, glycerin, fatty acid esters and oxyethylene-oxypropylene block polymers. Furthermore, the cationic surfactant includes alkylamine salts such as laurylamine acetate, and quaternary ammonium salts such as lauryltrimethylammonium chloride and stearyltrimethylammonium chloride. Then, the amphoteric surfactant includes aminocarboxylate salts and alkylamino acids.

A surfactant as described above can be used usually in an amount in the range of 0.01 to 10% by weight with respect to the polymerizable monomer. Since the use amount of such a surfactant influences the dispersion stability of a monomer, and influences also the environmental dependency of a polymerized toner particle obtained, the use thereof in the range described above is preferable which secures the dispersion stability of the monomer and hardly excessively influences the environmental dependency of the polymerized toner particle.

For production of the polymerized toner particle, a polymerization initiator is usually used. The polymerization initiator includes water-soluble polymerization initiators and oil-soluble polymerization initiators. In the present invention, either of them can be used. Examples of the water-soluble polymerization initiators usable in the present invention include persulfate salts such as potassium persulfate and ammonium persulfate, and water-soluble peroxide compounds. Examples of the oil-soluble polymerization initiators include azo compounds such as azobisisobutyronitrile, and oil-soluble peroxide compounds.

In the case of using a chain transfer agent in the present invention, examples of the chain transfer agents include mercaptans such as octylmercaptan, dodecylmercaptan and tert-dodecylmercaptan, and carbon tetrabromide.

Further in the case where the polymerized toner particle used in the present invention contains a fixability improving agent, the fixation improving agent usable is natural waxes such as carnauba wax, and olefinic waxes such as polypropylene and polyethylene.

In the case where the polymerized toner particle used in the present invention contains a charge control agent, the charge control agent to be used is not particularly limited, and usable are nigrosine dyes, quaternary ammonium salts, organometal complexes, metal-containing monoazo dyes, and the like.

External additives to be used for improving the fluidity and the like of the polymerized toner particle include silica, titanium oxide, barium titanate, fluororesin microparticles, acryl resin microparticles and the like. These may be used singly or in combination thereof.

The salting-out agent to be used for separation of the polymerized particle from the aqueous medium includes metal salts such as magnesium sulfate, aluminum sulfate, barium chloride, magnesium chloride, calcium chloride and sodium chloride.

The toner particle produced as described above has an average particle diameter in the range of 2 to 15 μm, and preferably 3 to 10 μm, and the polymerized toner particle has a higher uniformity of particles than the pulverized toner particle. If the toner particle is smaller than 2 μm, the chargeability decreases and the fogging and the toner scattering are liable to be caused; and the toner particle exceeding 15 μm causes the deterioration of the image quality.

The resin-coated carrier and the toner produced as described above are mixed to obtain an electrophotographic developer. The mixing ratio of the resin-coated carrier and the toner, that is, the toner concentration is preferably set at 3 to 15% by weight. The toner concentration less than 3% by weight hardly provide a desired image density; and the toner concentration exceeding 15% by weight is liable to generate the toner scattering and the fogging.

The electrophotographic developer according to the present invention may be used as a refill developer. In this case, the mixing ratio of the resin-coated carrier and the toner, that is, the toner concentration is preferably set at 100 to 3000% by weight.

The electrophotographic developer according to the present invention, prepared as described above, can be used in copying machines, printers, FAXs, printing machines and the like, which use a digital system using a development system in which electrostatic latent images formed on a latent image holder having an organic photoconductive layer are reversely developed with a magnetic brush of a two-component developer having a toner and a carrier while a bias electric field is being impressed. The electrophotographic developer is also applicable to full-color machines and the like using an alternative electric field, in which when a development bias is impressed from a magnetic brush to an electrostatic latent image side, an AC bias is superimposed on a DC bias.

Hereinafter, the present invention will be described specifically by way of Examples and the like.

EXAMPLE 1

Appropriate amounts of respective raw materials were dry mixed so as to be 39.7 mol % in terms of MnO, 9.9 mol % in terms of MgO, 49.6 mol % in terms of $Fe_2O_3$, and 0.8 mol % in terms of SrO, respectively, pulverized for 2 hours by a dry-type vibration mill, and granulated by a dry-type granulating machine to obtain a granulated material having a size of about 2 cm; and the granulated material was calcined at 950° C. using a rotary kiln furnace to obtain a calcined material. A slurry obtained by pulverizing the calcined material for 2 hours by a wet-type ball mill was again granulated and dried by a spray drier; and the granulated and dried material was sintered at 1,300° C. for 3 hours in a tunnel kiln furnace nitrogen atmosphere, and thereafter disintegrated and subjected to a particle size distribution adjustment to obtain a Mn—Mg—Sr ferrite core material having an average particle diameter of 60 μm.

Then, 150 g of a methylsilicone resin in terms of solid content was weighed and dissolved in 500 ml of toluene; and a carbon nanotube having a carbon content of 95% by weight, a fiber length of 3.0 μm and a content of an iron element of 32.5% by weight with respect to the total amount of the elements excluding carbon was further added by 5.0% by weight to the solid content of the methylsilicone resin, to obtain a coating solution. Here, the carbon content, the fiber length and the content of an iron element with respect to the total amount of the elements excluding carbon were measured by the following. The measurements were carried out similarly in succeeding Examples and Comparative Example.

(Carbon Content)

The measurement of the carbon content was carried out using a carbon analyzer C-200, made by LECO Corp. according to JIS-Z2615.

(Fiber Length)

The measurement of the fiber length was carried out using a scanning microscope JSM-6390, made by JEOL Ltd.

(Content of an Iron Element with Respect to the Total Amount of the Elements Excluding Carbon)

The measurement of the content of an iron element with respect to the total amount of the elements excluding carbon was carried out using ZSX100e, made by Rigaku Corp., and using an EZ scan as a contained element scanning function. The ratio of an iron element with respect to all the elements excluding carbon as measured by the EZ scan was calculated.

The coating solution was applied on 10 kg of the Mn—Mg—Sr ferrite core (magnetic particle) using a dip-type coating apparatus such that the coating amount of the methylsilicone resin became 1.5% by weight with respect to the magnetic particle. Thereafter, the coated magnetic particle was baked at 220° C. for 2 hours in a rack and box-type drier, disintegrated, and subjected to a particle size adjustment to obtain a resin-coated carrier.

EXAMPLE 2

A resin-coated carrier was obtained in the same manner as in Example 1, except for using a carbon nanotube having a carbon content of 95% by weight, a fiber length of 0.5 μm and a content of an iron element of 32.5% by weight with respect to the total amount of the elements excluding carbon.

EXAMPLE 3

A resin-coated carrier was obtained in the same manner as in Example 1, except for using a carbon nanotube having a carbon content of 95% by weight, a fiber length of 4.0 μm and a content of an iron element of 32.5% by weight with respect to the total amount of the elements excluding carbon.

EXAMPLE 4

A resin-coated carrier was obtained in the same manner as in Example 1, except for using a carbon nanotube having a carbon content of 98% by weight, a fiber length of 3.0 μm and a content of an iron element of 15.5% by weight with respect to the total amount of the elements excluding carbon.

EXAMPLE 5

A resin-coated carrier was obtained in the same manner as in Example 1, except for using a carbon nanotube having a carbon content of 92% by weight, a fiber length of 3.0 μl and a content of an iron element of 49.0% by weight with respect to the total amount of the elements excluding carbon.

EXAMPLE 6

A resin-coated carrier was obtained in the same manner as in Example 1, except for altering the content of the carbon nanotube with respect to the coating resin to 0.5% by weight.

EXAMPLE 7

A resin-coated carrier was obtained in the same manner as in Example 1, except for altering the content of the carbon nanotube with respect to the coating resin to 25% by weight.

EXAMPLE 8

A resin-coated carrier was obtained in the same manner as in Example 1, except for using an acryl resin as the coating resin.

EXAMPLE 9

A resin-coated carrier was obtained in the same manner as in Example 1, except for using an acryl-modified silicone resin as the coating resin.

EXAMPLE 10

A resin-coated carrier was obtained in the same manner as in Example 1, except for using a fluorine-modified silicone resin as the coating resin.

COMPARATIVE EXAMPLE 1

A resin-coated carrier was obtained in the same manner as in Example 1, except for using a carbon nanotube having a carbon content of 72.5% by weight, a fiber length of 3.0 μm and a content of an iron element of 22.5% by weight with respect to the total amount of the elements excluding carbon.

The types and the coating amounts on the magnetic particles (carrier core materials) of the coating resins, and the carbon contents, the fiber lengths, the contents of an iron element with respect to the total amounts of the elements excluding carbon, and the contents of the carbon nanotubes with respect to the solid contents of the coating resins, which were used in Examples 1 to 10 and Comparative Example 1, are shown in Table 1.

The electric resistances of the resin-coated carriers obtained in Examples 1 to 10 and Comparative Example 1 were measured, and the results are shown in Table 2. The measurement method of the electric resistance was as described above.

Each of the resin-coated carriers obtained in Examples 1 to 10 and Comparative Example 1 and a commercially available yellow toner for DocuPrintC3530, made by Fuji Xerox Co., Ltd., were weighed so that 1 kg of a developer having a toner concentration of 8% by weight was made, and thereafter stirred for 30 min. to obtain the developer. The charge amount (initial) of the developer was measured according to the following, and the results are shown in Table 2.

These developers were each loaded on DocuPrintC3530, made by Fuji Xerox Co., Ltd., and tested for endurance printing of 50K sheets. The charge amount (after the printing of 50K sheets) was measured according to the following, and the results are shown in Table 2.

(Charge Amount)

The charge amount of a mixture of a carrier and a toner was measured and determined by a suction-type charge amount measuring apparatus (Epping q/m-meter, made by PES-Laboratorium of Epping GmbH). A stainless steel mesh used was one having an aperture of 795 mesh. The suction pressure was set at 100 MPa, and the toner was sucked for 90 sec; and the charge amount was calculated from the amount of electric charge and a sucked toner amount after 90 sec.

The change rates in the charge amounts of Examples 1 to 10 and Comparative Example 1 were measured according to the following, and the results are shown in Table 2.

(Change Rate of the Charge Amount)

The change rate of the charge amount was calculated from the formula below based on the initial charge amount of the developer obtained as above and the charge amount after endurance printing of 50K sheets. Here, a value nearer 100% of the change rate of the charge amount indicates a smaller change, and the case of 100% thereof indicates no change.

$$\text{Change rate of a charge amount (\%)} = \frac{\begin{pmatrix}\text{Charge amount of a developer}\\\text{after 50K-sheets endurance}\\\text{printing}\end{pmatrix}}{\begin{pmatrix}\text{Charge amount of the developer}\\\text{after 30-min stirring}\end{pmatrix}} \times 100$$

Image evaluations (image density, fogging, edge phenomenon, color smear and white spot) of the above developers of Examples 1 to 10 and Comparative Example 1 were carried out based on the criteria below, and the results are shown in Table 2.

(Color Smear)

After a running of printing up to 50K sheets of an image chart with an image area of 0.5% using a commercially available digital full-color printer (DocuPrintC3530, made by Fuji Xerox Co., Ltd.), the color smear was evaluated in comparison with a previously prepared sample.

A: no color smear
B: almost no color smear
C: color smear exists but unnoticeable
D: apparent and noticeable color smear (Image Density, Fogging, Edge Phenomenon, and White Spot)

A running of printing up to 50K sheets was carried out using a commercially available digital full-color printer (DocuPrintC3530, made by Fuji Xerox Co., Ltd.). The image obtained after the printing of 50K sheets was examined for the image density, the fogging density, and the presence/absence of the white spot of a solid image. The image density and the fogging density were measured by use of a MacBeth densitometer on the basis of a transfer paper. The white spot was evaluated in comparison with a previously prepared image sample. These properties were evaluated based on the following.

A: excellent and in usable levels
B: good and in usable levels
C: basically good and in usable levels
D: poor and not in usable levels.

TABLE 1

| | Coating Resin | | Carbon Nanotube | | | |
| --- | --- | --- | --- | --- | --- | --- |
| | Kind | Coating Amount *1 (wt %) | Carbon Content (wt %) | Fiber Length (μm) | Iron Content *2 (wt %) | Content *3 (wt %) |
| Example 1 | Methylsilicone resin | 1.5 | 95 | 3.0 | 32.5 | 5 |
| Example 2 | Methylsilicone resin | 1.5 | 95 | 0.5 | 32.5 | 5 |
| Example 3 | Methylsilicone resin | 1.5 | 95 | 4.0 | 32.5 | 5 |

TABLE 1-continued

|  | Coating Resin | | Carbon Nanotube | | | |
|---|---|---|---|---|---|---|
|  | Kind | Coating Amount *1 (wt %) | Carbon Content (wt %) | Fiber Length (μm) | Iron Content *2 (wt %) | Content *3 (wt %) |
| Example 4 | Methylsilicone resin | 1.5 | 98 | 3.0 | 15.5 | 5 |
| Example 5 | Methylsilicone resin | 1.5 | 92 | 3.0 | 49 | 5 |
| Example 6 | Methylsilicone resin | 1.5 | 95 | 3.0 | 32.5 | 0.5 |
| Example 7 | Methylsilicone resin | 1.5 | 95 | 3.0 | 32.5 | 25 |
| Example 8 | Acryl resin | 1.5 | 95 | 3.0 | 32.5 | 5 |
| Example 9 | Acryl-modified silicone resin | 1.5 | 95 | 3.0 | 32.5 | 5 |
| Example 10 | Fluorine-modified silicone resin | 1.5 | 95 | 3.0 | 32.5 | 5 |
| Comparative Example 1 | Methylsilicone resin | 1.5 | 72.5 | 3.0 | 22.5 | 5 |

*1: Coating amount of a coating resin with respect to a carrier core material
*2: Content of an iron element with respect to the total amount of the elements excluding carbon
*3: Content of a carbon nanotube with respect to a solid content of a coating resin

TABLE 2

|  | Electric Resistance (LogΩ) | Charge Amount | | | Image Evaluation | | | | |
|---|---|---|---|---|---|---|---|---|---|
|  |  | Initial (μC/g) | After 50K (μC/g) | Change Rate (%) | Image Density | Fogging | Edge Phenomenon | Color Smear | White Spot |
| Example 1 | 8.5 | 30.9 | 25.8 | 83.5 | A | A | A | A | A |
| Example 2 | 10.3 | 33.4 | 24.3 | 72.8 | B | B | B | C | A |
| Example 3 | 7.1 | 28.1 | 22.0 | 78.3 | A | B | A | A | C |
| Example 4 | 7.9 | 29.6 | 19.4 | 65.5 | A | C | A | A | A |
| Example 5 | 11.1 | 32.5 | 27.3 | 84.0 | C | A | C | A | A |
| Example 6 | 11.2 | 34.9 | 27.8 | 79.7 | C | B | C | A | A |
| Example 7 | 6.2 | 25.4 | 20.1 | 79.1 | A | C | A | B | C |
| Example 8 | 8.1 | 33.8 | 28.6 | 84.6 | A | A | A | A | A |
| Example 9 | 8.2 | 31.2 | 24.1 | 77.2 | A | A | A | A | A |
| Example 10 | 8.9 | 26.9 | 20.6 | 76.6 | A | A | A | A | A |
| Comparative Example 1 | 12.3 | 33.2 | 23.0 | 69.3 | D | C | D | A | A |

As shown in Table 2, Examples 1 to 10 were good in any of the electric resistance, the initial charge amount and the charge amount after the printing of 50K sheets, and the change rate of the charge amount. Examples 1 to 10 were excellent also in the image evaluations (image density, fogging, edge phenomenon, color smear, and white spot).

By contrast, Comparative Example 1 was high in the electric resistance and inferior in the change rate of the charge amount. In the image evaluations, the image density and the edge phenomenon were beyond usable levels.

Use of the resin-coated ferrite carrier for an electrophotographic developer according to the present invention can provide an electrophotographic developer which does not cause color smear especially for a color toner, a decrease in image density due to high resistance of the carrier, and a decrease in image quality such as an edge phenomenon, and which further has a high durability.

Therefore, the present invention can be used broadly in the fields of full-color machines requiring a high image quality, high-speed machines requiring the reliability and durability of image maintenance, and the like.

What is claimed is:

1. A resin-coated carrier for an electrophotographic developer, wherein a magnetic particle is coated with a resin on its surface, and the coating resin comprises a carbon nanotube having a carbon content of 75% by weight or more,
   wherein the carbon nanotube has a content of an iron element of 10 to 50% by weight with respect to a total amount of elements excluding carbon.

2. The resin-coated carrier for an electrophotographic developer according to claim 1, wherein the carbon nanotube is contained in 0.1 to 25.0% by weight with respect to a solid content of the coating resin.

3. The resin-coated carrier for an electrophotographic developer according to claim 1, wherein the carbon nanotube has a fiber length of 0.5 to 4.0 μm.

4. An electrophotographic developer, comprising a resin-coated carrier according to claim 1, and a toner.

5. An electrophotographic developer, comprising a resin-coated carrier according claim 2, and a toner.

6. An electrophotographic developer, comprising a resin-coated carrier according claim 3, and a toner.

* * * * *